United States Patent [19]

Singer

[11] Patent Number: 4,707,899

[45] Date of Patent: Nov. 24, 1987

[54] METHOD OF MAKING ROCKET MOTOR EXTENDIBLE NOZZLE EXIT CONE

[75] Inventor: Victor Singer, Newark, Del.

[73] Assignee: Morton Thiokol, Inc., Chicago, Ill.

[21] Appl. No.: 768,089

[22] Filed: Aug. 21, 1985

[51] Int. Cl.$^4$ ............... B23P 15/00; B21D 53/92; B64C 15/06

[52] U.S. Cl. ................... 29/157 C; 72/379; 60/242; 60/271; 239/265.33; 239/265.43

[58] Field of Search ....... 29/157 C, 157.1 R, 156.4 R; 60/242, 271, 253; 239/265.15, 265.19, 265.43, 265.33; 72/167, 168, 368, 379

[56] References Cited

U.S. PATENT DOCUMENTS

| | | | |
|---|---|---|---|
| 2,593,420 | 4/1952 | Diehl | 239/265.43 |
| 3,258,913 | 7/1966 | Moorehead | 239/265.43 |
| 3,267,559 | 8/1966 | Lauk | 29/157 R |
| 4,184,238 | 1/1980 | Carey | 239/265.43 X |
| 4,272,956 | 6/1981 | Lamere et al. | 239/265.15 X |
| 4,387,564 | 6/1983 | Carey | 60/242 |

FOREIGN PATENT DOCUMENTS 680453 10/1952 United Kingdom ........... 239/265.43

Primary Examiner—Charlie T. Moon
Attorney, Agent, or Firm—James C. Simmons; Gerald K. White

[57] ABSTRACT

A rocket motor extendible nozzle, in a first embodiment of the invention, is made by folding a sheet stock (metal, etc.) development of a membrane in the form of a cone or conical frustum (with a straight meridian) in such manner that the aft or larger diameter region of the cone that is constructed by joining the opposed edges may have the aft portion collapsed for stowage in a single layer of fluted form contained between two planes perpendicular to the axis of the cone with reduced overall length, and the forward portion extensively folded for substantially increased rigidity in comparison with the fully deployed unit. A second embodiment of the invention differs from the first embodiment in the further development of the membrane such that the aft end of the cone may be collapsed for stowage in multiple layers with vastly reduced overall length while retaining the increased rigidity of the forward portion in the stowed condition. Deployment is induced by forward-to-aft gas flow of the rocket motor within the cone.

10 Claims, 21 Drawing Figures

METHOD OF MAKING ROCKET MOTOR EXTENDIBLE NOZZLE EXIT CONE

BACKGROUND OF THE INVENTION

1. Field of the Invention

The present invention relates to an improvement in an extendible nozzle exit cone for rocket motors that are designed for operation at vacuum or near vacuum conditions.

2. Description of the Prior Art

Deep space ballistic missile systems or satellite probes require high performance, low weight, and highly packageable primary propulsion systems. Excluding propellant tanks, the largest component of the propulsion system is the rocket motor exhaust nozzle. The rocket motor nozzle takes up a large amount of valuable space relative to its mass.

The exit cone of a conventional nozzle for rocket motors is designed for optimum performance at the median altitude of the intended trajectory. One of the functions of the exit cone is to provide an inclined surface against which the expanding exhaust plume of the rocket motor can bear, thereby to provide some of the forward thrust of the rocket motor. The exhaust plume grows larger with increasing altitude of the rocket motor because of the lower pressures of the ambient atmosphere at the higher altitudes. At low altitudes, the exhaust plume is too small for the available surface of the exit cone. As a result, a partial vacuum tends to form on the inside edges of the exit cone, thereby creating an atmospheric drag on the rocket. At high altitudes, the exhaust plume is too large for the exit cone so that much of the potential energy is unused. A rocket motor nozzle that is sufficiently large to make full use of the expanding exhaust gases of a rocket motor in the low pressures existing at high altitudes would normally occupy an inordinately large proportion of the available storage space in silos, submarines, and between stages of a multiple-stage missile.

Various proposals have been made in the prior art to provide a large expansion ratio nozzle that can be stowed in a configuration of reduced length and thereby made to fit in a minimal space, and that can be extended to a configuration suitable for high altitude operation after motor ignition and lift off. These have included the use of:

(a) a rocket motor nozzle extension cone or skirt that is folded in a single layer inwardly and forwardly of the rocket motor nozzle when in a stowed position, and is actuated, that is, deployed to a fully extended position by foward-to-aft flow of rocket motor gas, as disclosed in U.S. Pat. No. 3,358,933 to J. H. Altseimer, and in U.S. Pat. No. 4,272,956 to G. C. Lamere et al.;

(b) an inflatable rocket motor extension cone or skirt that is folded forwardly of, that is back around the rocket motor nozzle, exteriorly thereof, and later inflated by rocket motor gas to achieve a desired frusto conical shape aft of the rocket motor nozzle, as in U.S. Pat. No. 3,596,465 to T. O. Paine et al.;

(c) a rocket motor extension cone or skirt that is folded forwardly of, that is, back around the motor nozzle, exteriorly thereof, and including a cover assembly attached to the aft or exit end of the skirt that seals the extension cone, and upon motor operation, seals the gas pressure therein sufficient to cause the skirt to unroll into its extended configuration, as in U.S. Pat. No. 3,711,027 to L. F. Carey and U.S. Pat. No. 3,784,109 to J. W. Dueringer;

(d) a rocket motor extension cone that is folded forwardly of, that is, back around the motor nozzle, exteriorly thereof, and including a plurality of mechanical actuators for causing the skirt to unroll into its extended configuration, as in U.S. Pat. No. 3,346,186 to D. L. Fulton et al., U.S. Pat. Nos. 4,125,224, 4,162,040, 4,184,238 and 4,387,564 to L. F. Carey, U.S. Pat. No. 4,213,566 to L. E. Miltenberger, and U.S. Pat. Nos. 4,383,407 and 4,489,889 to F. S. Inman;

(e) a rocket motor extension cone as described in item (d) further including a skirt attached to the aft end of the extension cone that is flared toward the interior of the extension cone when the latter is in its stowed position and is actuated into its extended configuration by a forward-to-aft flow of rocket motor gas, as in U.S. Pat. Nos. 4,125,244, 4,162,040, 4,184,238, and 4,387,564 to L. F. Carey.

There are problems with the prior art proposals for providing high performance over the entire range of intended trajectory. They are deficient in meeting the large expansion ratio, that is, the ratio of the area at the exit plane of the extendible nozzle cone to the area of the nozzle throat, required for high altitude rocket flight while still remaining within length, weight and economic limiting constraints.

Thus, with respect to the prior art mentioned in item (a) above, which prior art is schematically represented by FIG. 1 of the drawings, it is evident that since the length $L_s$ along the straight meridian of the extended cone portion 1 of a rigid cone 2 cannot exceed the radius $R_f$, the exit opening of cone 2, the length $L_a$ along the longitudinal axis 3 of the cone extension 1 must be smaller than $L_s$. This seriously limits the expansion ratio that is obtainable by the prior art of item (a) since the length $L_s$ must be short enough to fit within cone 2 in the stowed condition.

The prior art of item (b) involves the use of an inflatable extension cone consisting of two woven stainless steel interconnected panels and including a manifold connection for dumping rocket motor gas between the panels for inflating the cone. The double panel and manifold connection both add undesirably to the weight, bulk and complexity of the construction.

With respect to the prior art of item (c), the requirement for the cover assembly that is attached to the exit end of the extension skirt adds undesirably to the weight of the extension cone, the transverse load thereon, and the complexity of the construction.

The prior art of items (d) and (e) involve the use of mechanical actuators such as pneumatic cylinders that add undesirably to the weight, bulk and complexity of the construction.

In my copending application for patent bearing Ser. No. 762,472 filed Aug. 15, 1985, there is disclosed an extendible rocket motor nozzle exit cone that is folded inwardly of itself, in multiple layers from the aft end, to provide a very large area ratio at the exit plane to be stowed in a much reduced envelope in comparison to the aforementioned prior art. As a consequence of the reduced length of the forward portion of the cone, and because the stowed aft portion maintains the shape at the interface, the cone, in the stowed condition thereof, is quite rigid.

The present invention is concerned particularly, in a first embodiment, with a form of extendible rocket motor exit cone in which an aft portion of the membrane of the nozzle extension is stowed in a single layer of fluted form, being folded inwardly of itself and contained between two planes perpendicular to the cone axis, and in which the forward portion of the membrane of the cone is extensively folded. In the first embodiment, the maximum overall reduction in length is less than is achievable with the extendible rocket motor exit cone of my aforesaid copending application for patent, but the forward portion of the cone is more rigid in the stowed condition. In a second embodiment, a somewhat smaller reduction of envelope is obtained than with the extendible rocket motor exit cone of my copending application, but the stowed configuration of the forward portion of the membrane is stiffer by virtue of the folds.

SUMMARY OF THE INVENTION

An object of the invention is to provide an improved method for making an extendible rocket motor exit cone having a very large area ratio from a flat sheet or membrane of refractory metal or other suitable material, the aft portion of which extendible exit cone may be collapsed by folding inwardly for stowage with the forward portion of the cone, particularly in the stowed condition, being characterized by the rigidity thereof, and the deployment of which cone lends itself to induction by a forward-to-aft gas flow therein upon motor operation.

A further object of the invention is to provide a method of folding a sheet stock (metal, etc.) development of a cut arcuate membrane in the form of a cone or conical frustum, with a straight meridian, in such a manner that the aft or larger diameter region of the cone that is constructed by attaching the opposed ends in edge-to-edge relationship may be collapsed for stowage with reduced overall length, minimum diameter, and with substantially increased rigidity in the stowed condition, the material comprising the aft portion of the membrane being so situated with respect to the forward portion thereof that deployment may be induced by forward-to-aft gas flow within the cone.

Still another object of the invention is to provide an improved method for making an extendible nozzle exit cone from very thin membranes which is characterized in that, in the stowed form, the forward portion of the extendible nozzle exit cone is quite rigid.

A further object of the invention is to provide an improved extendible nozzle exit cone for rocket motors in which the extreme aft portion of the extendible nozzle exit cone membrane is foldable inwardly of the cone in at least a single layer, and an adjacent aft portion thereof is stowable in a single layer of fluted form between two planes perpendicular to the cone axis, and in which a forward portion of the membrane is extensively folded whereby the cone may be stowed in a reduced envelope and in the stowed form is quite rigid.

In accomplishing these and other objectives, the invention, in one embodiment, comprises a system of folding a suitably cut sheet stock (refractory metal or other heat resistant and erosion resistant material) development of a cut arcuate membrane in the form of a cone or conical frustum, with a straight meridian, in such a manner that the aft or larger diameter region of the cone that is constructed by joining the two opposed straight edges may be collapsed for stowage with vastly reduced overall length, maximum diameter, and with substantially increased rigidity in comparison with the fully deployed unit. In the stowed condition, the membrane comprising a first aft portion of the cone, in a first embodiment of the invention, is situated in a single layer of fluted form within a forward portion of the cone so that deployment is readily induced by forward-to-aft gas flow from the rocket motor within the cone. In a second embodiment of the invention, there is provided, in addition, between the single layer of fluted form and the exit plane of the cone, a second aft portion situated in at least a single layer of fluted form within a forward portion of the cone whereby deployment thereof may be effected by a forward-to-aft flow therethrough of rocket motor gas. The forward portion of the membrane in both embodiments of the invention is quite rigid, being extensively folded.

The present invention includes an optional means for locally reinforcing the cone to increase the meridional stiffness, thereby diminishing the susceptibiliity thereof to buckling under the meridional compressive loading produced by internal pressurization after deployment, during motor operation.

The present invention further includes an optional arrangement of thickness reductions of the sheet material at the fold or crease locations, thereby allowing the membrane regions of the deployed cone to be more resistant to flutter during motor operation than if the entire sheet were at the maximum foldable thickness.

The various features of novelty which characterize the present invention are pointed out with particularity in the claims annexed to and forming a part of this specification. For a better understanding of the invention, its operating advantages, and specific objects attained by its use, reference is made to the accompanying drawings and descriptive matter in which preferred embodiments of the invention are illustrated.

DESCRIPTION OF THE PREFERRED EMBODIMENTS

In accordance with the present invention, there is provided an improved method for making an extendible nozzle exit cone for attachment to the exit end of a rocket motor nozzle. A portion of the aft end of the cone is initially folded inwardly of a forward portion thereof for collapsing the cone for compact stowage. The inwardly folded aft end is adapted to be unfolded, upon firing of the rocket motor, due to the forward-to-aft flow of rocket motor gas through the extendible nozzle exit cone. Such extension of the extendible nozzle exit cone increases the ratio of the effective rocket motor extendible nozzle exit plane area to the rocket motor nozzle throat area. By folding a substantial portion of the aft end within the forward end of the extendible exit cone in the collapsed condition thereof, there is provided a larger exit plane area at firing of the rocket motor for effecting a build up of sufficient pressure within the cone for fast and smooth unfolding, and hence, deployment of the cone to its extended position.

Figure 7:
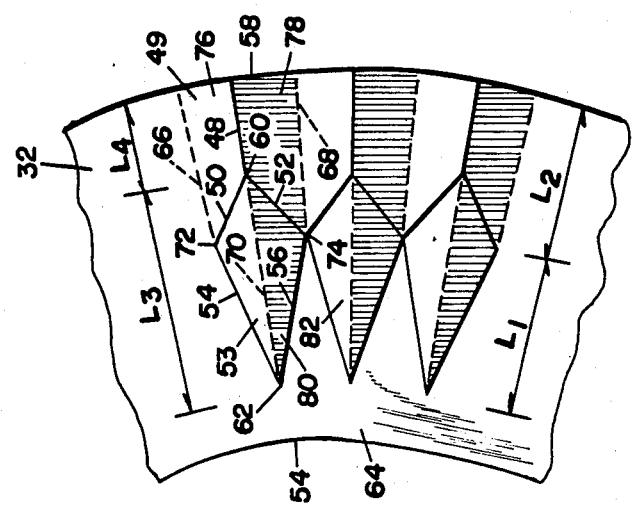
FIG. 7 is a view of a partial plan, specifically a fourth, of the developed exterior surface of the extendible nozzle exit cone of FIGS. 2 through 6.
Figure 11:
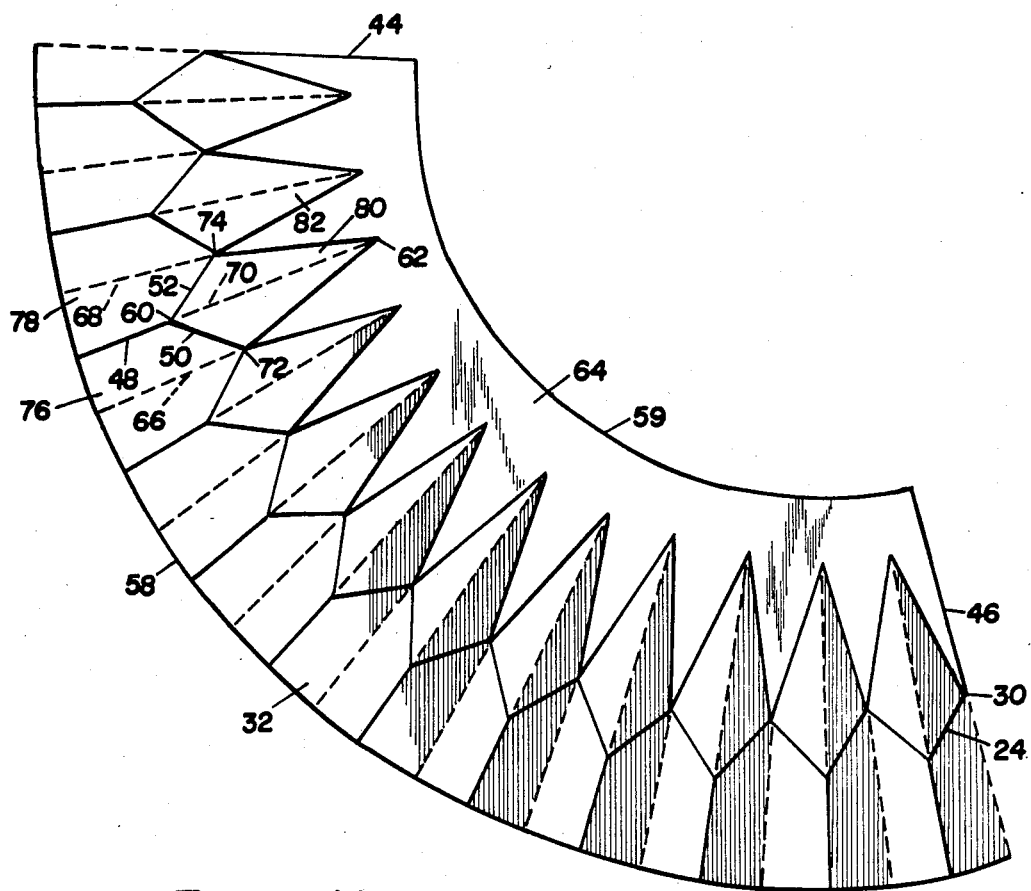
FIG. 11 illustrates a brake-pressed and cut thin arcuate sheet metal workpiece that is obtained preliminary to further forming into the extendible nozzle exit cone of the invention.

The method of the present invention comprises several steps including cutting a workpiece of heat-resistant ductile material, as described hereinafter, into plan view arcuate form of appropriate size, as illustrated in FIGS. 7 and 11, with opposed straight ends that may be brought into edge-to-edge relationship to form a frustum of a cone. The arcuate form of the workpiece is so selected that the smaller radius end of the frustum of a cone is suitable for attachment to the exit end of the rocket motor nozzle and the larger radius end of which is of such size as to provide the desired increase in area ratio.

Following the step of cutting the arcuate shaped workpiece of thin heat-resistant material, the workpiece is deformed over a substantial portion adjacent to the longer arcuate side to provide thereon a pattern comprising two sets of folds or creases in each of twelve substantially equal sectors into which the workpiece is divided. The first set of the creases points at the viewer from the exterior of the workpiece, as it subsequently is formed into the frustum of a cone. The second set points away from the viewer. The two sets of creases, as shown in FIGS. 7 and 11, are so formed on the surface of the workpiece and in such relation with each other that when the opposed straight ends of the arcuate workpiece are attached to each other to form a frustum of a cone, the aft end of the cone may be folded radially inwardly in a single fluted layer contained between two planes perpendicular to the cone axis, with the forward portion of the cone comprising a plurality of generally longitudinally flat leaf portions interconnected by folds. While the workpiece is described as being divided into twelve sectors, it will be understood that a number of sectors greater than twelve, all of equal size, may be provided, if desired. A number of sectors greater than four is necessary, however, for the folding and unfolding of the membrane to be feasible.

A further step in the making of the extendible nozzle exit cone of the present invention includes attaching the opposed straight ends of the arcuate workpiece in edge-to-edge relationship as by a single weld to form a frustum of a cone. This step is followed by a step involving axi-symmetric folding inwardly, as by hand, a portion of the surface immediately forward of the larger diameter or aft end of the cone in a single layer of fluted form between two planes perpendicular to the cone axis and extensively folding the forward portion of the cone thereby to collapse the cone for compact stowage.

FIGS. 2 through 6 depict a particular version of an extendible nozzle exit cone 10, according to the invention, for a rocket motor designated by the numeral 12 having a submerged nozzle 14. The cone 10 may be made, as hereinbefore described, by folding a flat sheet or membrane 16 of suitably cut refractory metal or other heat and erosion resistant material.

Figures 1, 2:
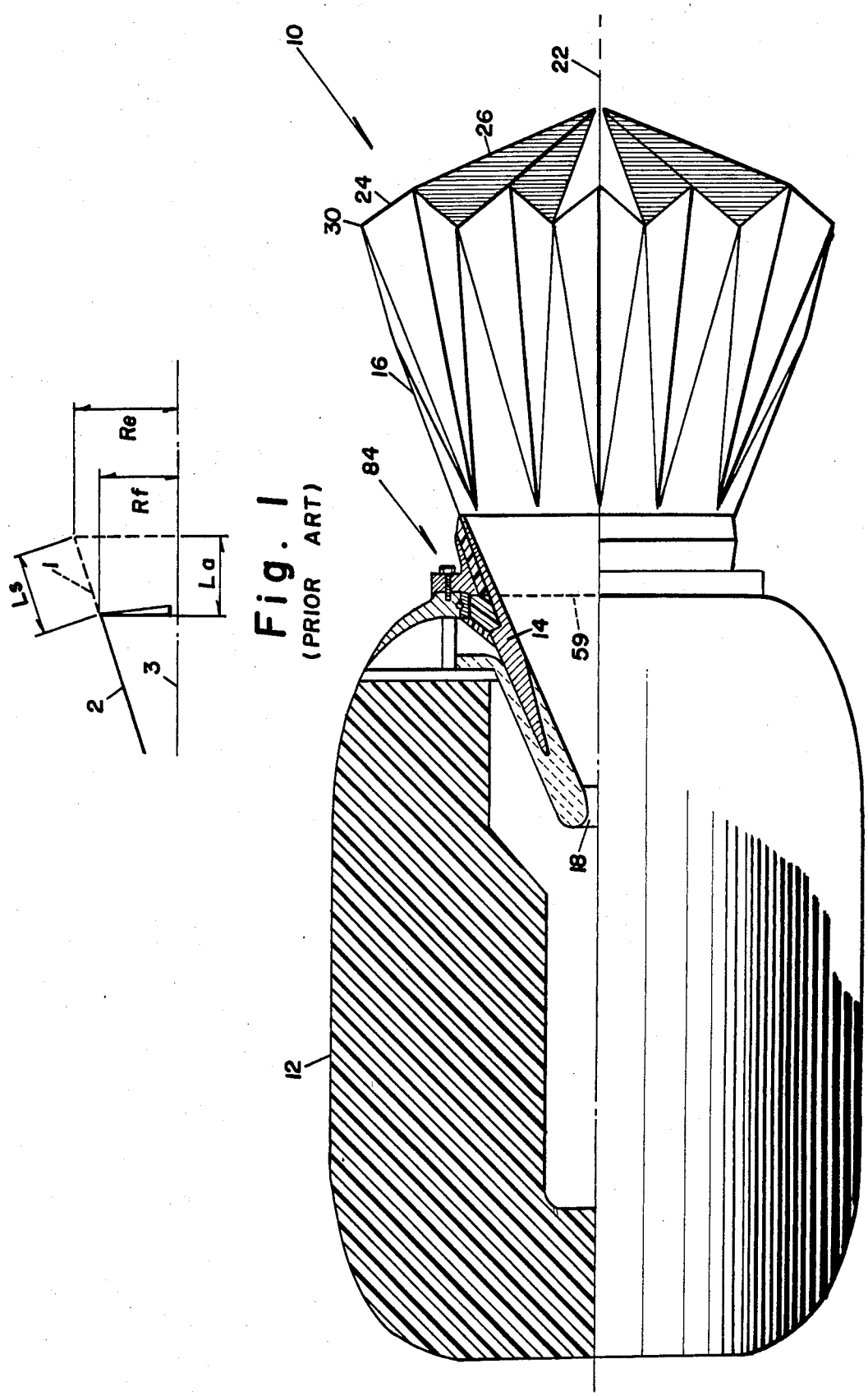
FIG. 1 is a schematic fragmented drawing illustrating certain relationships of a prior art nozzle extension as mentioned hereinbefore.
FIG. 2 is a side view, with a portion shown in cross section, of a rocket motor having an extendible nozzle exit cone according to a first embodiment of the present invention, with the extendible nozzle exit cone shown in the stowed condition thereof.

By way of example and not limitation, it is noted that in each of the disclosed embodiments of the invention, the nozzle 14 of the rocket motor 12 may have a throat 18 having a diameter of 3.85 inches. The membrane 16 of the deployed or extended extendible nozzle exit cone 10 may have a 17° half angle, and is attached in conventional and suitable manner, to the rocket motor cone 14 of thicker material at a diameter in the 23 to 27 inch range. A preferred manner for attaching the extendible nozzle exit cone 10 to the rocket motor cone 14 is shown in FIG. 2 and is described in detail in connection with FIG. 12. The thicker cone 14 of smaller area ratio may have a half angle larger than 17°.

Figure 6:
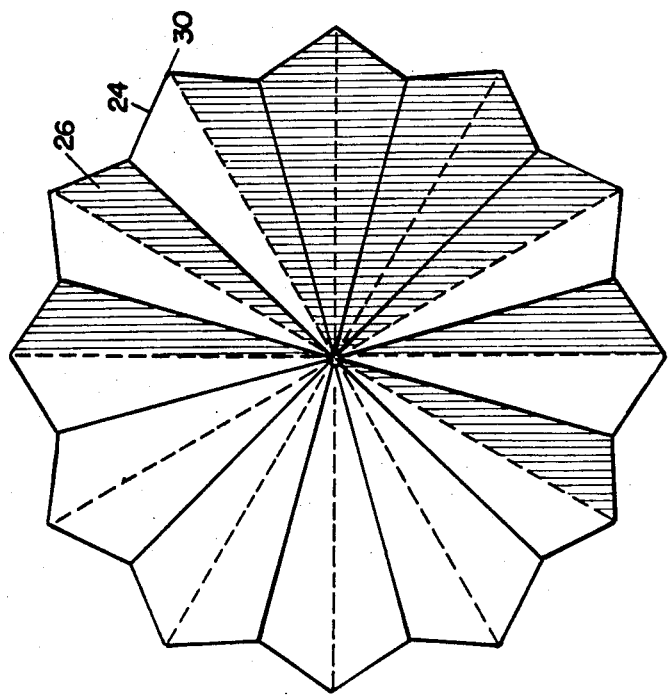
FIG. 6 is a view of the aft end of the extendible cone in its stowed condition.

On the extendible membrane exit cone 10, comprising the first embodiment of the invention, the area ratios are 100 at the exit plane 20 and 61 at a point of departure, designated 30, from the generally conical form. At this intermediate location 30, the aft end view of the stowed configuration is as shown in FIG. 6.

Figure 15:
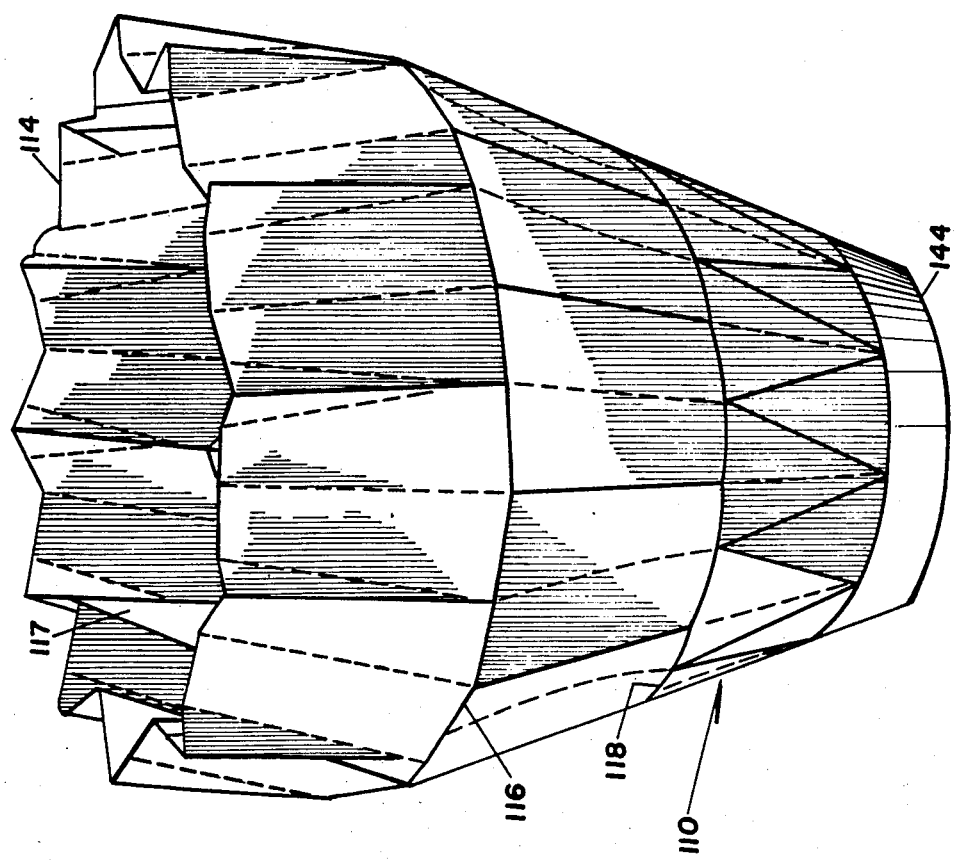

For the second embodiment of the invention, the area ratios are 148 at the exit plane 114, as seen in FIG. 15, and 61 at the point of departure 118 from the generally conical form.

One-fourth of the developed surface of the first embodiment cone, showing fold or crease lines and fold directions, is shown in FIG. 7.

FIG. 2 illustrates the fully stowed condition of the extendible exit cone 10. With this first embodiment, the overall reduction of length at the longitudinal axis 22 of the extendible cone 10, is about 74% of the exit plane radius, and more than 95% of the deployed radius at the intermediate location 30. In the second invention embodiment, the overall reduction of length at the longitudinal axis of the extendible cone is about 115% of the radius of the exit plane 114 and about 181% of the deployed radius at the intermediate location 118. This is substantially more than what has been accomplished in the prior art, as represented by FIG. 1. In each of the first and second embodiments, the free length of the conical membrane 16 between where it clears the attachment to the rocket motor nozzle 14 and the location, 30 or 118, respectively, of the departure from generally conical form, is about 16 inches.

As those skilled in the art will understand, greater or lesser deployed-to-stowed condition envelope reductions, and forms with larger or smaller exit plane area ratios, may be achieved through alterations of the angular frequency, the number of approximately circumferential folds, and the distances between adjacent folds. In the fully stowed condition, as shown in FIGS. 2 and 6, the folds at the aft end of the extendible cone 10 form a pyramid 26 with the apex thereof on the longitudinal axis 22, which pyramid 26 closes the exit end of the cone 10. This closure of cone 10 is sufficiently tight that upon initiation of operation or firing of the rocket motor 12, the resulting pressurization within the cone and forward-to-aft flow of gas causes the folds of cone 10 to unfold and to deploy the cone 10 to its fully extended condition in a smooth sequence of unfolding the numerous folds.

Figure 3:
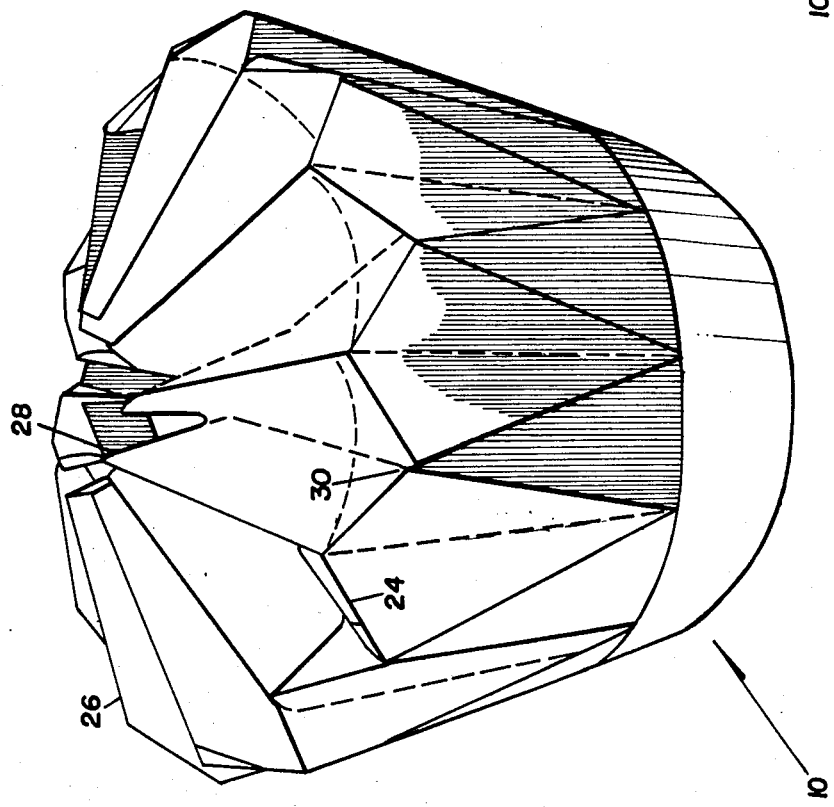

FIG. 3 illustrates the situation as deployment begins. The approximately radial features or folds indicated at 28, which catch the gas as forward-to-aft flow begins, are clearly visible. Each side of these radial features 28 is comprised of a zone between the exit plane 20 and a circumferential fold line, indicated at 24, intermediate the width of the one-fourth of full development region shown in FIG. 7. Each radial feature 28 consists of a single layer of membrane 16.

Figure 4:
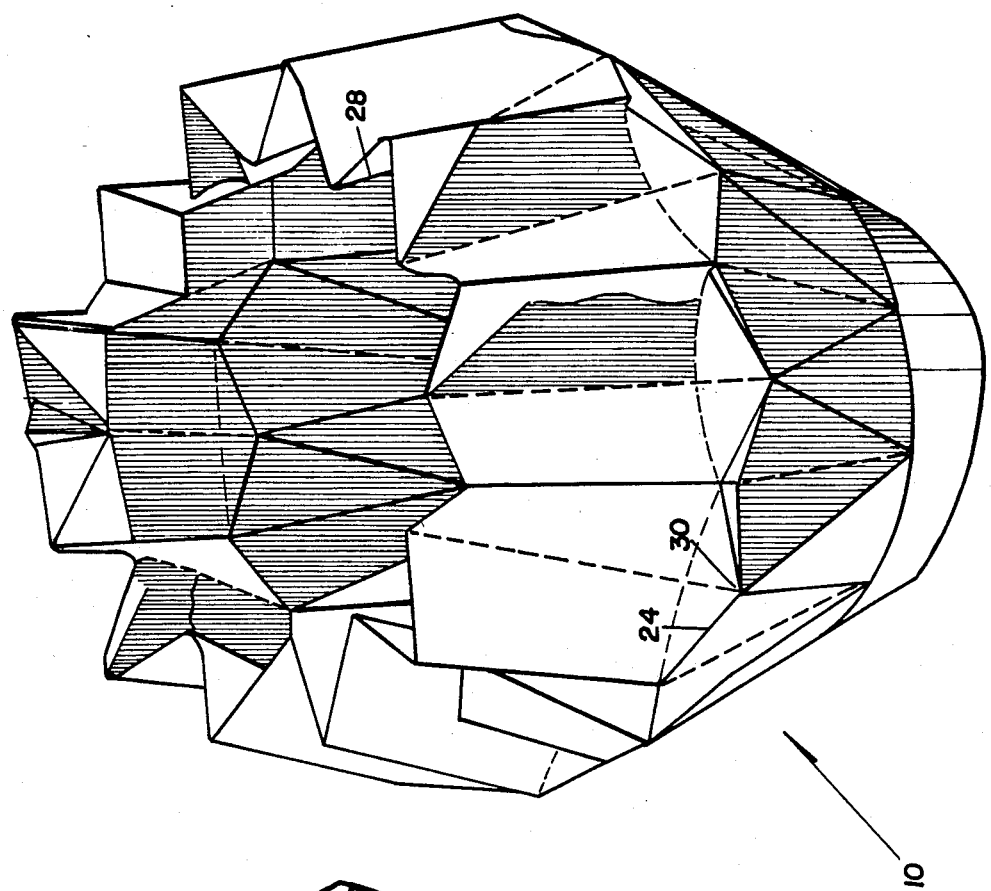
FIGS. 3 through 5 are perspective views showing the extendible nozzle exit cone of FIG. 2 in various stages of deployment thereof.
Figure 5:
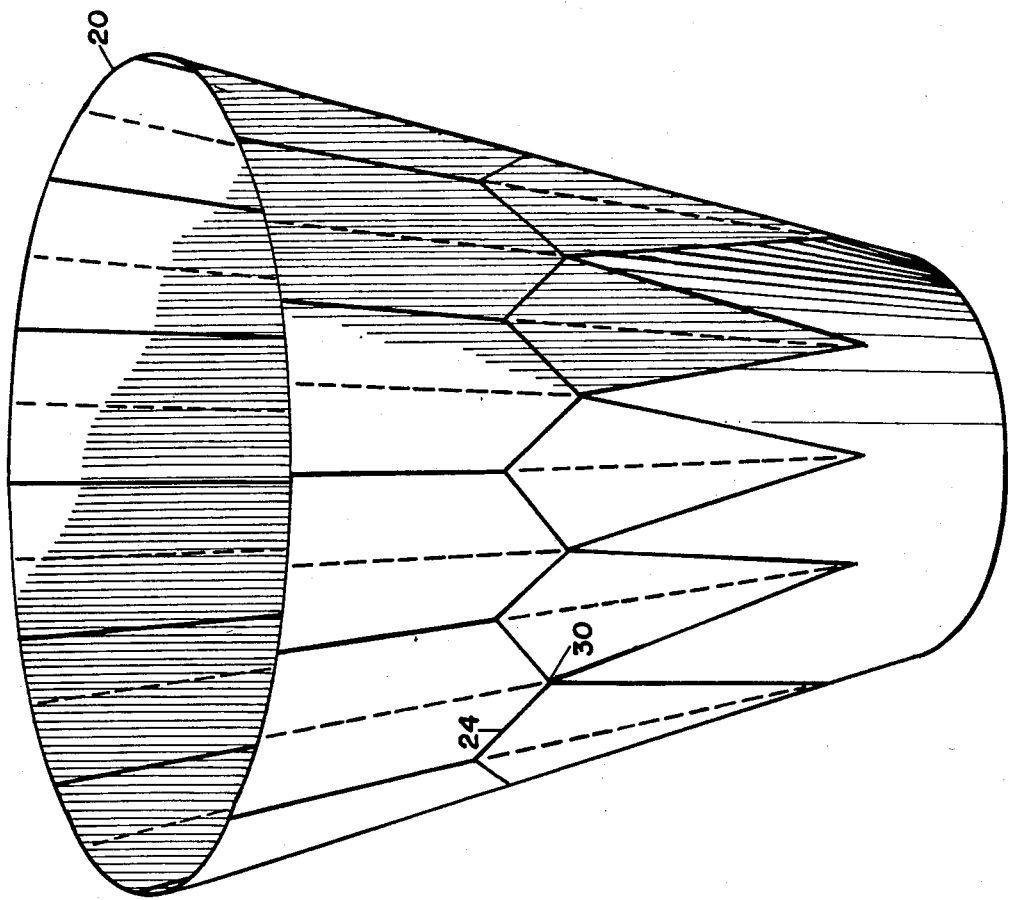

FIGS. 4 and 5 illustrate the approximately radial features 28 that continue to be exposed during deployment. These radial features 28 capture the gas which forces the continuation of unfolding and deployment. In FIG. 4, all that remains to be accomplished for complete deployment is the development of a sufficient rate of flow of forward-to-aft gas within the membrane 16 of exit cone 10 to force it to the stable circular form shown in FIG. 5.

Figure 8:
FIG. 8 is a schematic view illustrating a section of the fully deployed extendible cone of FIGS. 2 through 6.

FIG. 8 schematically illustrates a section of the fully deployed cone 10.

In the partial plan development of the exterior surface of the extendible exit cone 10, as shown in FIG. 7, fold lines are shown either as solid lines or dotted lines. Those shown solid have the apex thereof pointing toward the viewer. Those shown dotted have the apex pointing away from the viewer. The lengths $L_1$ and $L_2$ shown in FIG. 7 correspond to the similarly lettered lengths in FIG. 8.

Figure 9:
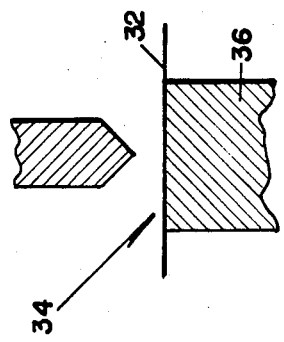
FIG. 9 is a fragmentary perspective view showing how a thin sheet metal workpiece may be positioned upon the table of a brake press for having fold or crease lines formed thereon.

In accordance with the invention, the pattern of folds or creases, as shown in FIG. 7 and 11, may be made in an appropriately cut membrane 16 of arcuate shape forming a workpiece 32 by means of a brake press 34, as schematically illustrated in FIG. 9. A brake press is a well known device in the art and is widely used for bending and producing shapes from ferrous and nonferrous metal sheets and plates. Particular advantages of a brake press are its versatility, the ease and speed with which it can be changed from one set up to another, and low costs of tooling. A brake press is a slow speed punch press having a long relatively narrow bed or table and one or more rams mounted between end housings. The rams may be actuated mechanically or hydraulically.

For facilitating the brake press operation, it may be desirable to use a conventional brake press 34 modified in a manner well known to those skilled in the art. Thus, there is a need to control the length of the edge on the table 36 of the brake press 34, as shown in FIG. 9, to accommodate the several lengths of the different creases. Thus, it is contemplated to modify the brake press 38 by the use of several tables 36 each with an edge of the required length and which may be substituted, one for another, in making the folds or creases in the membrane 16.

Figure 10:
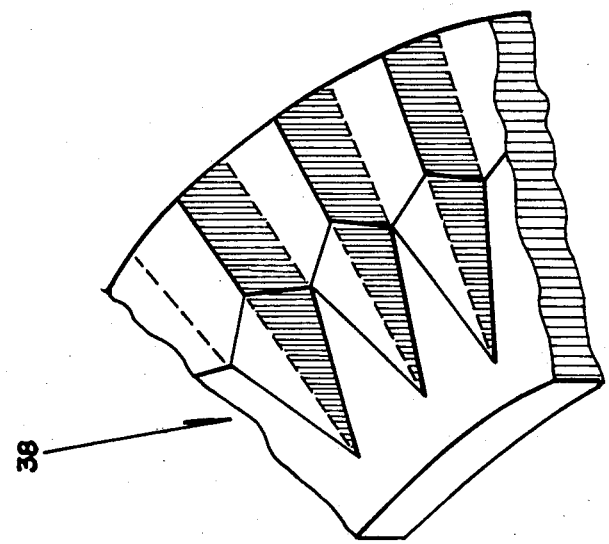
FIG. 10 is a fragmentary perspective view showing, alternatively, how a thin metal sheet may be placed upon a die plate and crease pressed to form the fold or crease lines thereon.
Figure 10A:
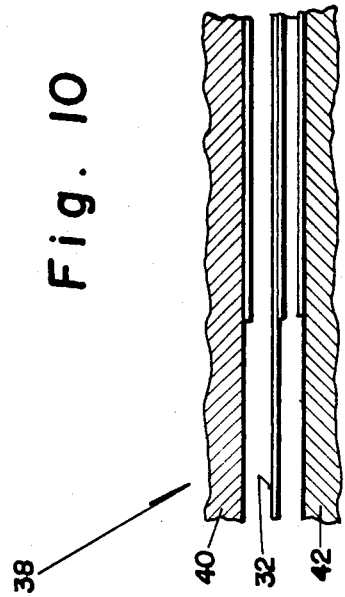
FIG. 10A is a fragmentary view illustrating the operation of the die press of FIG. 10.

As those skilled in the art will understand, also, the pattern of folds or creases may be formed in the membrane 16 by means of a die press 38, as shown in FIGS. 10 and 10A, the membrane 16 being laid upon a die plate and crease-pressed. That is to say, the membrane 16 is placed between upper and lower die pieces 40 and 42, as shown in FIG. 10A. The surface configurations of die pieces 40 and 42 complement each other so that the die press 38 deforms the workpiece 32 to provide the desired pattern of folds or creases. The die press 38 may be selected, as desired, to make the required creases on both sides of the sheet or workpiece 32 as shown in FIG. 10A, in one die pressing operation, or in several such operations, for example, one-fourth thereof, as shown in FIG. 7, in each of four successive die pressing operations.

By reference to FIGS. 7 and 11, it will be seen that the pattern of creases or fold lines that is formed on the workpiece 32 of FIG. 11, from which cone 10 is formed, is comprised of first and second sets. The first set of the crease lines is shown in solid lines. The second set is shown in dotted lines.

Figure 12:
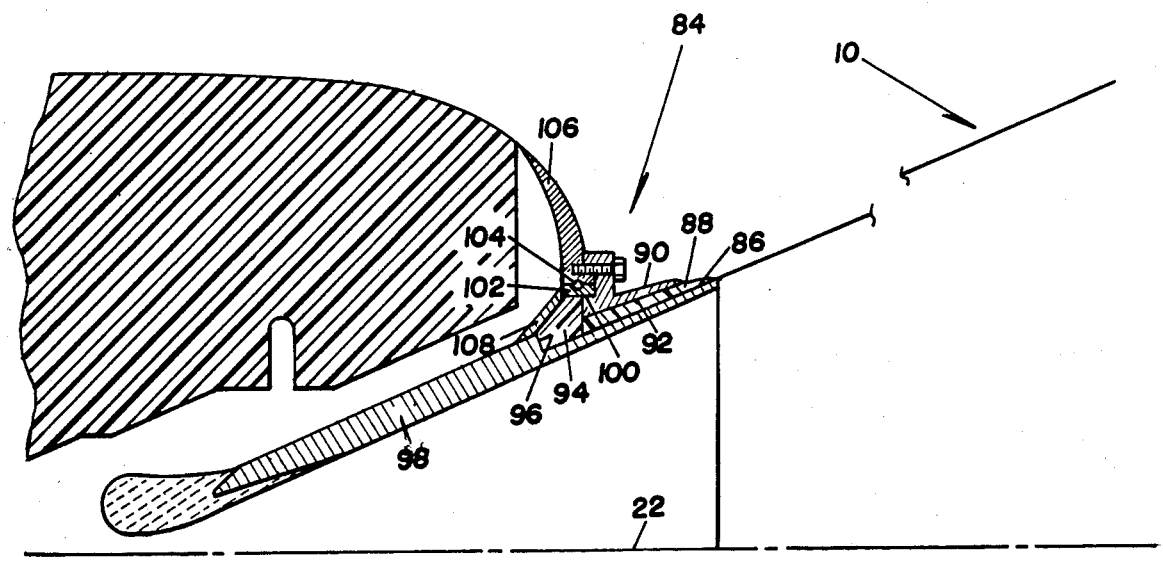
FIG. 12 is a fragmentary view illustrating a trapped supporting system for the extendible nozzle of the invention.

The first set of crease lines for a one-twelfth section of the complete workpiece 32 includes crease lines 48, 50, 52, 54 and 56. Crease line 48 extends transversely of a first transverse region or outer portion, designated 49, of the workpiece 32, normal to the outer, longitudinal or arcuate side 58 thereof. At the inner end thereof, at a junction 60, the crease line 48 meets the end of each of two crease lines 50 and 52 that are paired in a diverging configuration longitudinally of the workpiece 32. Each of the other ends of the crease lines 50 and 52 connects to a respectively associated end of crease lines 54 and 56 that are paired in a converging configuration across an inner portion or second transverse region, designated 53, of the workpiece 32. The crease lines 54 and 56 meet at a junction 62. Crease lines 50 and 52 form an interface between the first region 49 and the second region 53. The width of a third region, designated 64, between the junction 62 and the inner arcuate edge 59 of the workpiece 32 may be selected such as to facilitate attachment of the work piece 32, when formed into the extendible cone 10, to the submerged nozzle 14 of the rocket motor 12, as shown in FIGS. 2 and 12.

The second set of crease lines for a one-twelfth section of a complete workpiece 32 includes crease lines 66, 68 and 70. Crease line 66 is in the first region 49 and extends from the outer arcuate edge 58 of the workpiece 32, normal thereto, to the junction 72 of the diverging crease line 50 and the converging crease line 54 at the interface of the first region 49 and the second region 53. Similarly, crease line 68 extends in the first region from the workpiece outer side 58, normal thereto, to the junction 74 of the diverging crease line 52 and the converging crease line 56. Crease line 70 extends in the second region 53, between the junctions 60 and 62.

It is noted that each of the crease lines 66 and 68 is shared with a one-twelfth section of the workpiece 32 on the side adjacent thereto.

FIG. 11 illustrates a brake-pressed, or die pressed, and cut membrane sheet or workpiece 32 showing the plurality of bends or creases that have been formed therein. Following the brake pressing or die pressing operation, the opposed straight ends 44 and 46 are attached to each other in any suitable manner, as for example by a single weld, to form the extendible exit cone 10.

Upon completion of the welding operation, the extendible cone so formed may be placed in the stowed condition thereof by pinching the flat leaf portions 76 and 78 on either side of the crease lines 48 to pleat-fold the membrane 16, of which the cone 10 is formed, inwardly upon itself, progressively and axi-symmetrically from the aft end to the circumferential fold line 24 formed by the diverging crease lines 50 and 52. The flat leaf sections 80 and 82 of adjacent one-twelfth sections of the workpiece 32, as seen in FIG. 11, may then be pinched to effect pleat-folding about the crease lines 70, thereby to reduce the diameter and to increase the rigidity of the cone 10 in the stowed condition thereof. Such pleat-folding may be done by hand.

In FIG. 12 there is depicted, in a fragmentary view, a section of the stowable and extendible cone 10 with a trapped supporting system 84. Specifically, the forward portion 64 of the extendible cone 10 is trapped between the outer aft surface 86 of the cone of the submerged nozzle 14 of the rocket motor 12 and an annular band of plastic insulation 88. Surrounding the annular band of insulation 88 is an annular titanium closure 90 having an inner surface 92 that fits snugly over the outer surface of the plastic band 88.

For supporting the cone extension 10 in a proper positional relationship with respect to the cone of the rocket motor nozzle 14, there is provided a five-sided plastic ring 94. Plastic ring 94 desirably may be made in four separate sections for facilitating the assembly of the trapped supporting system 84. On the aft side thereof, as seen in FIG. 12, the plastic ring 94 is in abutting relationship with the annular band of plastic insulation 88 and the closure 90. On the forward side thereof, the five-sided plastic ring 94 is in abutting relationship with an annular shoulder 96 on the rocket motor cone 98. A titanium ring 100 having a circumferential groove 102 is slipped over adjacent circumferential surfaces of the titanium closure 90 and the plastic ring 94. An O-ring 104 which may be made of rubber or other suitable elastomeric material is provided in the groove 102 for sealing the interface between the rocket motor case 106 and the assembly 84. An annular plastic band 108 may be attached by a suitable adhesive to the adjoining surfaces of the rocket motor cone 98, plastic ring 94 and titanium ring 100.

The membrane 16 employed in the fabrication of the extendible nozzle cone 10 may be made of any suitable ductile, heat and erosion resistant metal or alloy. Metal alloys preferred for this construction are:

Columbium 10% Hafnium

Columbium 10% Tungsten 10% Hafnium 0.1% Yttrium
(melting point approximately 4350° F.)
Tantalum 10% Tungsten
(melting point approximately 5500° F.)

Each of these metal alloys is available in sheet stock. In 0.005 inch thickness, the weight of the first Columbium-based sheet is equivalent to about 0.033 inch 2D carbon-carbon and the weight of the tantalum-based sheet is equivalent to about 0.058 inches of 2D carbon-carbon (the term 2D meaning two-dimensional).

Figure 14:
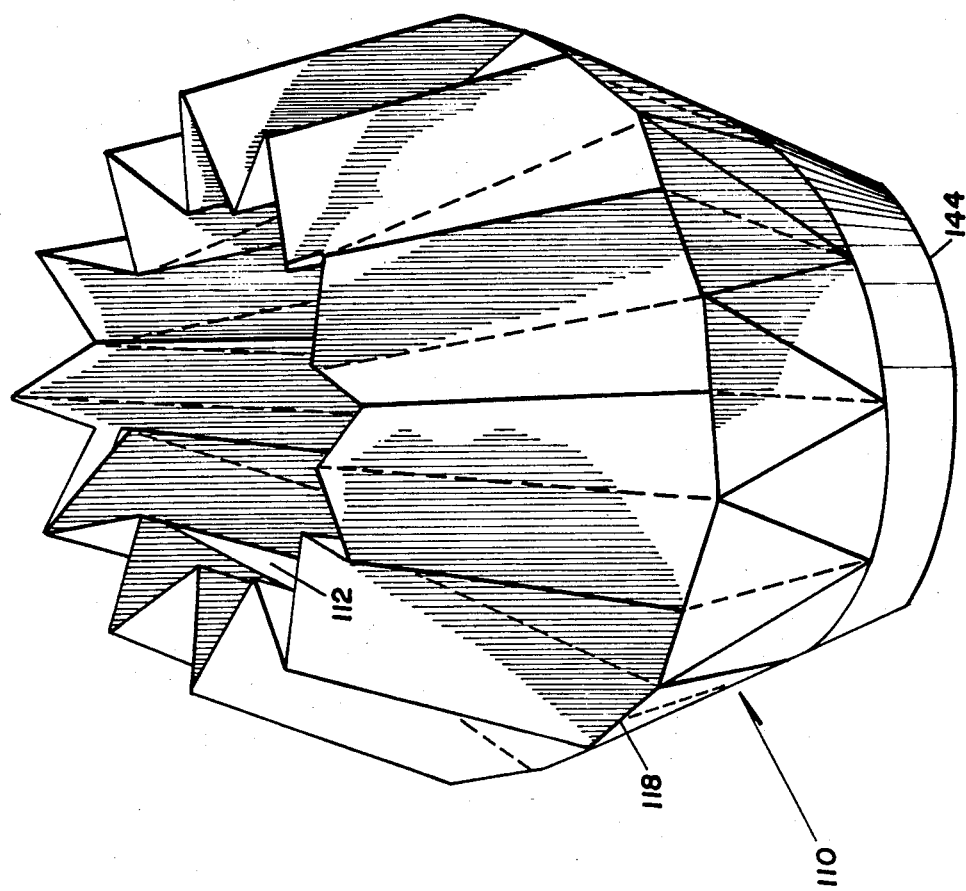
FIGS. 14 and 15 are perspective views showing the extendible nozzle exit cone of FIG. 13 in different stages of deployment thereof.
Figure 13:
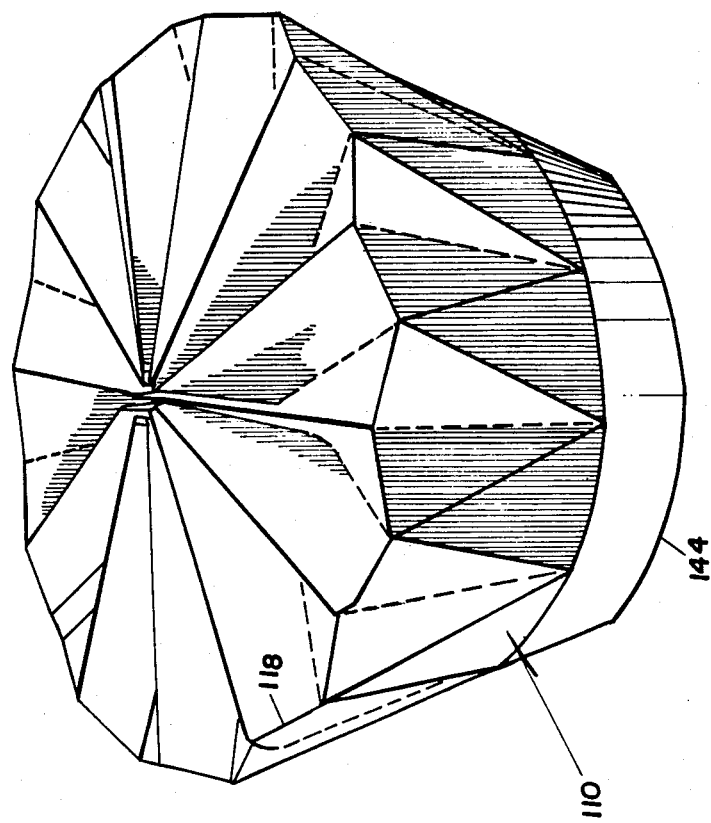
FIG. 13 is a perspective view of a rocket motor extendible nozzle exit cone according to a second embodiment of the invention, with the cone being shown in a stowed condition.
Figure 16:
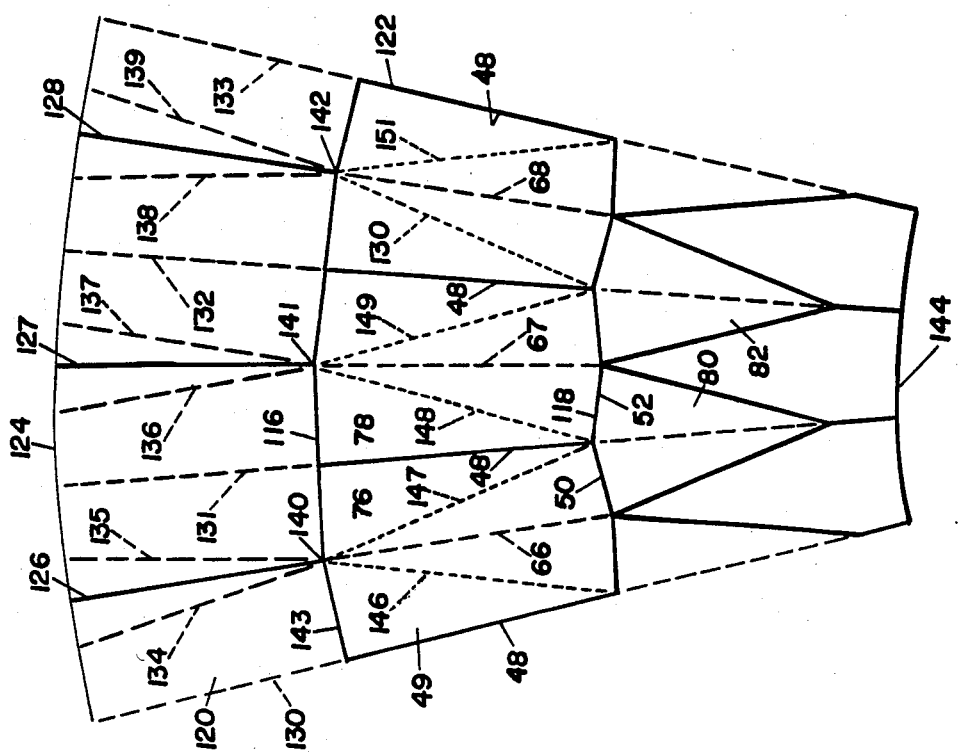
FIG. 16 is a view of a partial plan, specifically, a fourth of the developed surface of the extendible nozzle exit cone of FIGS. 13 through 15.

A second embodiment of the invention is illustrated in FIGS. 13-16. FIG. 13 illustrates the fully stowed condition of an extendible exit cone 110 according to this embodiment. FIG. 14 illustrates the situation as deployment of the extendible exit cone 110 begins. The approximately radial features or folds 112, which catch the gas as forward-to-aft flow of rocket motor gas begins, are clearly visible. Each side of these radial features 112 is comprised of a region or zone between the exit plane 114, as seen in FIGS. 15 and 16, and an approximately circumferential fold line or first interface 116. The flat leaf portions 76 and 78 extend between the first interface 116 and an approximately circumferential fold line or second interface 118 that is formed by the diverging crease lines 50 and 52.

Each radial feature 112, as seen in FIG. 14, consists of two layers of membrane 16. FIG. 15 illustrates the approximately radial features 117 that continue to be exposed during deployment. These radial features capture the rocket motor gas which forces the continuation of deployment. In FIG. 15 all that remains to be accomplished for complete deployment of the extendible exit cone 110 is the development of a sufficient rate of flow, forward-to-aft, of gas within the membrane 16 of exit cone 110 to force it to the stable conical form.

A partial plan development for one-fourth of the exterior surface of the extendible exit cone 110 illustrated in FIGS. 13-15 is shown in FIG. 16. In FIG. 16, fold lines are shown either as solid lines or dotted lines, as in FIGS. 7 and 11. Those shown solid have the apex thereof pointing toward the viewer while those shown dotted have the apex pointing away from the viewer.

By comparing FIGS. 7 and 16, it will be seen that the second embodiment of the invention is obtained by adding to the workpiece 32 of FIG. 7 from which the cone 10 of the first embodiment is formed, an additional transverse region, which has been designated 120, between the flat leaf portions 76 and 78 and the outer longitudinal or arcuate side 124 of the workpiece 122 from which the extendible exit cone 110 of the second embodiment is formed. Thus, the single layer fluted zone shown stowed in the first embodiment of FIGS. 2 and 3 becomes two layers in the second embodiment. The farthest aft zone of the deployed cone 110 is stowed on the forward side of the fluted zone.

As those skilled in the art will understand, one or more additional sections corresponding to the section 120 may be provided, if desired, further to extend the length of the extendible cone 110. It is noted that when providing such additional sections, care must be taken to ensure that the fold or crease lines of the added section complement those of the preceding section. That is to say, crease lines of the several sections that are in alignment with each other must alternately face toward and away from the viewer.

For convenience in describing FIG. 16, fold or crease lines corresponding to those of FIGS. 7 and 11 have been designated by the same reference numbers.

In FIG. 16, the crease or fold lines in the additional region 120 of the workpiece 122 comprise two sets, one set shown solid and the other set shown dotted. Again, the apex of the solid lines face toward the viewer and the apex of the dotted lines face away from the viewer.

The first or solid set of fold or crease lines in each one-fourth section of the workpiece 122 shown in FIG. 16 include, in the additional region 120, three crease lines 126, 127 and 128, that extend normal to the outer acuate edge 124 of workpiece 122 and are in alignment with the dotted lines 66, 67 and 68, respectively. A second set of crease lines in the additional region 120 include four crease lines 130, 131, 132 and 133 of the second set, each of which crease lines extends normal to the outer or arcuate edge 124 of workpiece 122 and are in alignment with an associated crease line 48 of the first set. The second set of crease lines in the additional region 120 further include three pairs of crease lines 134, 135; 136, 137; and 138, 139 that converge at a respectively associated junction 140, 141 and 142 with the lines 126, 66; 127, 67; and 128, 68 on a second interface 143.

As also shown in FIG. 16, pairs of fold or crease lines 146, 147; 148, 149; and 150, 151 of the second set which diverge inwardly in the first region 49 of workpiece 122 from junctions 140, 141 and 142, respectively, may be optionally provided, with the apex of each facing away from the viewer, to minimize twisting in the flat leaf portions 76 and 78.

Figure 17:
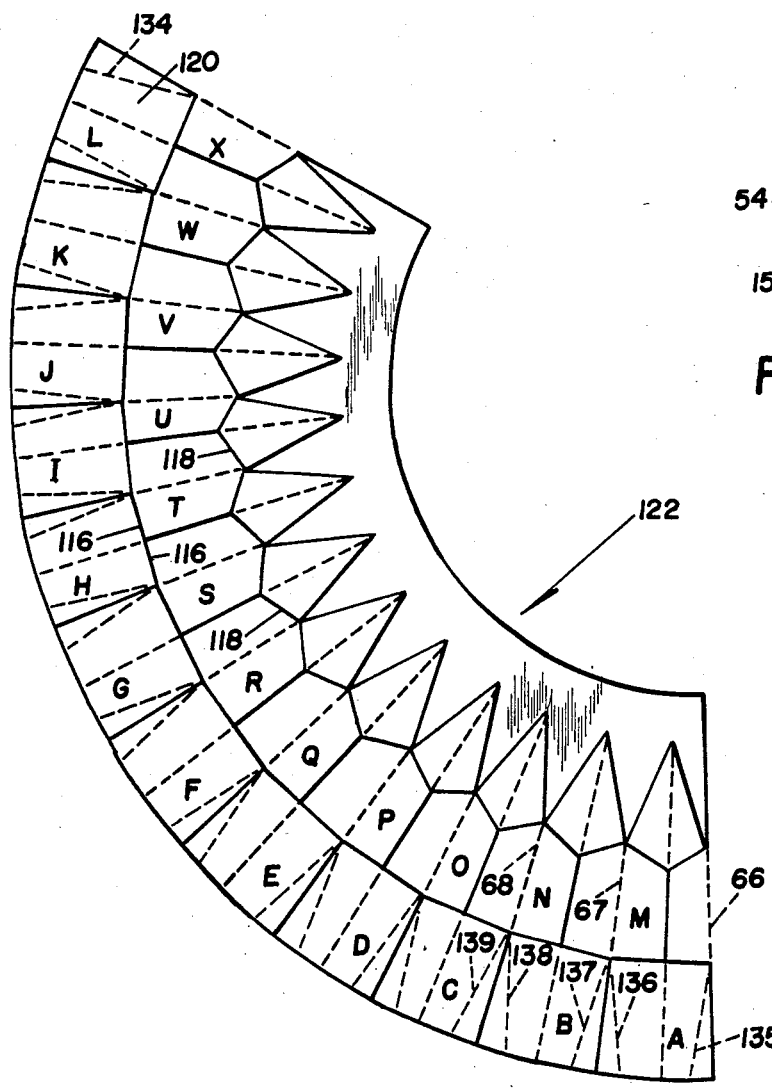
FIG. 17 illustrates a manner of folding the membrane axi-symmetrically at the several fold lines beginning with the aft end of the extended cone in collapsing the aft end of the cone for stowage in a forward portion thereof.

FIG. 17 illustrates how the membrane workpiece 122 of FIG. 16, when formed into exit cone 110, may be folded inwardly upon itself progressively and axi-symmetrically from the aft end to the second approximately circumferential fold line 118 whereby to place the extendible cone 10 in the stowed condition thereof. Such folding may be by hand.

For convenience of illustration, the fold lines for initiating the inward folding of the extendible cone 110 about the approximately circumferential fold line 116 have been indicated in FIG. 17 by the letters A through L. Suitably spaced apart ones of the folds, for example, folds A, F, K, D, I, B, G, L, E, J, C and H are pinched, in turn, from the outer surface of the membrane 16. Specifically, pinching the flat leaf portions on the opposite sides of the fold line A causes the membrane 16 to fold outwardly therealong. This facilitates inward folding along the adjacent crease lines 134 and 135. Pinching the flat leaf portions on the opposite sides of each of the other fold lines F, K, D, I, B, G, L, E, J, C and H, in turn, enables the membrane 16 to be similarly folded in the sectors in which those fold lines are located. The pinched folds may then be folded inwardly, one after the other, along the approximately circumferential fold line 116. The order of such inward folding may be the same as that in which alphabetically identified fold lines were pinched. With a first inward layer so produced, the appearance of the cone 10 is substantially the same as shown in FIG. 14.

A substantially identical procedure may be followed for effecting the inward folding of the aft end of the extendible exit cone 110 about the approximately circumferential fold line 118. Thus, as shown in FIG. 17, the folds for effecting this operation are designated by the letters M through X. Pinching the flat leaf portions on the opposite sides of the fold line M causes the membrane 16 to fold outwardly there along. This facilitates folding of membrane 16 inwardly along the adjacent crease lines 66 and 67. Here, again, folding of suitably spaced apart ones of the folds is effected, for example in the order of M, R, W, P, U, N, S, X, Q, V, O and T. Upon completion of such folding, the fold lines M through X may then be folded inwardly, one after the other, along the approximately circumferential fold line 118. Such inward folding of the fold lines may be in the same order in which they were pinched. The appearance of the cone 110 with the second inwardly folded layer is substantially the same as shown in FIG. 13.

The foregoing manner of inward folding of the extendible exit cone is referred to herein as "axi-symmetrical" folding.

Figure 18:
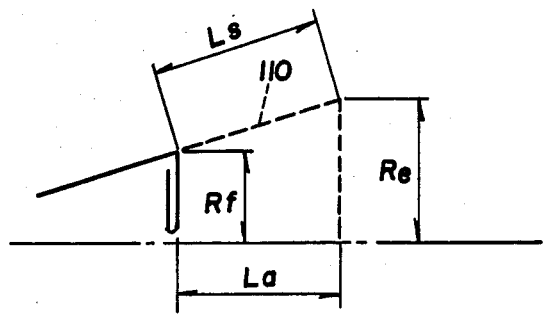
FIG. 18 is a schematic drawing illustrating certain relationships of the extendible nozzle exit cone according to the invention as contrasted with corresponding relationships of the prior art illustrated in FIG. 1.

In FIG. 18 there is shown a schematic drawing illustrating certain relationships of the nozzle extension cone 110 according particularly, to the second embodiment of the invention described in connection with FIGS. 13–17 and which distinguish significantly from corresponding relationships, as described hereinbefore, in connection with the prior art representation of FIG. 1. By reference to FIG. 18, it will be seen that since the meridian length $L_s$ is stowed in multiple layers, the length $L_s$ may be much larger than the radius $R_f$ at the exit plane 114 of the portion of cone 110 that is not folded. This portion, as seen by reference to FIG. 13–15 is that portion between the forward cut off or inward longitudinal edge 144 of membrane 16 of workpiece 122 and the second approximately circumferential fold line 118. It is noted, that if desired, $L_s$ may be larger than $R_e$, the radius at the exit plane 114 of the extendible cone 110. As described hereinbefore in connection with the prior art representation of FIG. 1, the length $L_s$ of the prior art cannot exceed $R_f$.

In accordance with the present invention, it is contemplated that the extendible exit cone 10 of the first embodiment and the extendible exit cone 110 of the second embodiment may be made of thicker sheet stock than demanded by the hoop membrane force and milled (conventionally or chemically) along all of the solid and dotted fold or crease lines. Thus, the fold zones are sufficiently flexible for folding, while the membrane has enough flexural rigidity to resist flutter.

Figure 19:
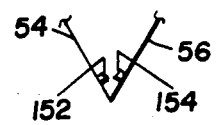
FIGS. 19 and 20 are fragmentary views which illustrate the use of stiffeners that may be used to provide local stiffness to the folds of the extendible nozzle of FIGS. 1 through 5 and FIGS. 13 through 15.
Figure 20:
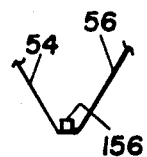

Further, it is contemplated that to either side of each solid fold of length $L_3$, as seen in FIG. 7, a stiffener 152 and 154 may be welded to the sheet, as illustrated in FIG. 19. Alternatively, double folds and a single stiffener 156 may be provided, as shown in FIG. 20. Similar stiffeners may be provided at each solid fold of lengths $L_2$, as seen in FIG. 7. It will be noted that these stiffeners, when provided, overlap through a distance of $L_3-L_1$.

In the fully deployed condition, the torsional rigidity of the region between the $L_3$ and $L_2$ stiffeners (that is, the ability to withstand R-Z plane rotations at successive circumferential positions) provides a moment restraint to the adjacent stiffeners. The torsional rigidity is affected by the angular distance between folds. These stiffeners serve to minimize the potential for buckling under meridional compression.

In summary, it is noted that the first embodiment of the invention herein disclosed comprises an improvement over the prior art by:

(a) eliminating the constraint that the meridional length of the folded extension be smaller than the exit cone radius at the point of attachment to structure farther forward;

(b) substantially improving the stiffness and strength of the stowed structure with respect to transverse loadings, that is, loadings, transverse to the motor axis; and (c) eliminating the need for relatively massive support structure at the forward extreme of the portion of the extension which is stowed approximately perpendicular to the motor axis.

The second embodiment of the invention herein disclosed, in particular, permits a sufficient amount of membrane material to produce a very large area ratio at the exit plane to be stowed in a much reduced envelope in comparison with the prior art. Thus, as shown in FIG. 1 which represents the prior art, since the length, $L_s$, along the meridian of the extendible cone, cannot exceed the radius, $R_f$, at the region of attachment of the extendible cone to the rocket motor nozzle, the length $L_a$ along the longitudinal axis of the extendible cone must be smaller than the length $L_s$.

With the second embodiment of the present invention, as represented by the schematic drawing of FIG. 18, it will be seen that since the length $L_s$ is stowed in many layers, the length $L_s$ may be much larger than the radius $R_f$ at the region of attachment of the extendible cone to the rocket motor nozzle, or even larger than the radius $R_e$ at the exit plane of the extendible cone.

In the illustrated embodiments of the invention, because of the reduced length and fluted structure of the forward portion of the cone, and because the stowed aft portion maintains the shape at the interface, the stowed form of the cone is quite rigid. The membrane exit cone is not usable at all without such rigidity because it is too flimsy prior to motor ignition.

Because the required stiffness of the non-folded exit cone membrane is determined by pre-use inertia loading (i.e., prior to the development of internal pressure which stiffens the structure during use), the invention makes possible the use of thinner, hence lighter, exit cone membranes than would otherwise be possible. Thus, the maximum achievable exit diameter that is practicable (before weight increase requires a greater increase of impulse than the area ratio permits) is made larger.

With this description of the invention in detail, those skilled in the art will appreciate that modifications may be made to the invention without departing from its spirit. Therefore, it is not intended that the scope of the invention be limited to the specific embodiments illustrated and described. Rather, it is intended that the scope of the invention be determined by the appended claims.

What is claimed is:

1. The method of making an extendible nozzle exit cone for attachment to the exit end of a rocket motor nozzle with a portion at least of said extendible nozzle exit cone being initially folded inwardly thereof for compact stowage relative to the rocket motor nozzle and adapted to be unfolded upon firing of the rocket motor due to forward-to-aft flow of rocket motor gas therethrough for substantially increasing the ratio of the effective rocket motor nozzle/extendible nozzle exit cone exit plane area to the rocket motor nozzle throat area, said method comprising:

(a) cutting a workpiece of thin sheet heat-resistant ductile material into plan view arcuate form having first and second transverse regions between inner and outer arcuate sides, the outer arcuate side being longer than the inner arcuate side, and including opposed ends that may be brought into edge-to-edge relationship to form a frustum of a cone the smaller radius end of which is suitable for attachment to the exit end of a rocket motor nozzle and the larger radius end of which is of such size as to provide the desired increase in area ratio;

(b) deforming said arcuate workpiece adjacent the longer arcuate side from one end of the arcuate workpiece to the other so as to include in said first arcuate region of said workpiece a plurality of spaced creases running transversely thereof in first and second sets with the apex of each of the creases of the first set pointing at the viewer and the apex of each of the creases of the second set pointing away from the viewer, some of the creases of said first and second sets being normal to the outer arcuate side of said workpiece and disposed in alternating relation with each other, such creases of the first set being shorter than such creases of the second set, so as to include in said second arcuate region of said workpiece others of the creases of the second set of creases that uniformly extend part way through said second region toward the shorter arcuate side of said workpiece from the inner end of an associated one of said first set of creases, in alignment therewith, at the interface of said first and second regions, and so as to include others of said creases of said first set extending between the other end of an associated one of such other creases of the second set and the inner end of an associated one of the second set of creases first mentioned, and so as to include at the interface of said first and second regions creases of the first set that extend longitudinally of said workpiece, such that when the opposed ends of said workpiece are attached to each other in edge-to-edge relationship, the surface of the cone, for a portion at least of the length thereof, may be folded inwardly and forwardly in at least a single layer of fluted form between two planes perpendicular to the longitudinal axis of the cone and in which a forward portion of the cone is extensively folded whereby the cone may be stowed in a reduced envelope and in the stowed form is quite rigid;

(c) attaching the opposed ends of the arcuate workpiece together to form a frustum of a cone; and (d) progressively folding, inwardly and forwardly of the larger radius end of said frustum of a cone, the aft surface of said cone in a single inwardly folded layer of fluted form, and progressively folding a forward portion of said cone;

whereby said frustum of a cone so made is adapted to be attached at the smaller radius end thereof to the exit end of a rocket motor nozzle with the cone in a stowed position relative thereto; and whereby upon rocket motor firing, the stowed frustum of a cone may deploy due to the forward-to-aft flow of rocket motor gas therethrough to provide a substantially increased ratio of the effective rocket motor nozzle/extendible exit cone exit plane area to the rocket motor nozzle throat area.

2. The method as set forth in claim 1 wherein said workpiece is formed of an alloy comprising Columbium 10% and 10% Hafnium.

3. The method as set forth in claim 1 wherein said workpiece is formed of an alloy comprising Columbium, Tungsten, 10% Hafnium and 0.1% Yttrium.

4. The method as set forth in claim 1 wherein said workpiece is formed of an alloy comprising Tantalum and 10% Tungsten.

5. The method as set forth in claim 1 wherein in the step of deforming the arcuate workpiece the creases are formed therein in a pattern that is repeated in each of at least five substantially equal sectors into which the workpiece is divided.

6. The method as set forth in claim 1 wherein in the step of deforming the arcuate workpiece the creases are formed therein in a pattern that is repeated in twelve substantially equal sectors into which the workpiece is divided.

7. The method as set forth in claim 1 wherein the step of cutting said workpiece includes providing an additional transverse region between said first transverse region and the outer arcuate side of said workpiece, and the step of deforming said arcuate workpiece includes deforming the interface between said additional region and said first region by including between said first and additional regions a plurality of creases of the first set extending longitudinally from one end of the arcuate workpiece to the other, and further includes deforming said additional region so as to include therein a plurality of spaced creases of said first and second sets running transversely between said interface and the outer side of said workpiece, normal thereto, and in alignment, respectively, with creases of said second and first sets in said first region, said last creases of the first set meeting said longitudinally extending creases of the first set at a junction, and further so as to include in said additional region on either side of the transverse crease of the first set therein a crease of the second set running between the outer side of said arcuate workpiece and the junction of the creases of the first set at the interface between said first and additional regions.

8. The method as set forth in claim 8 wherein in the step of deforming the arcuate workpiece the creases are formed therein in a pattern that is repeated in at least twelve substantially equal sectors into which the workpiece is divided.

9. The method as set forth in claim 7 further including the step of deforming the arcuate workpiece so as to include creases of the second set extending to the junction at the interface of said first and second regions of the creases of the first set from the junction at the interface of said second and additional regions of the creases of the first set.

10. The method as set forth in claim 1 wherein the folded aft layer of the frustum of a cone blocks the forward-to-aft flow of gas from the rocket motor to cause a build up of pressure within the cone upon firing of the rocket motor sufficient to provide a positive force for unfolding and deploying the cone to its extended position.

* * * * *